United States Patent Office  3,085,916
Patented Apr. 16, 1963

3,085,916
METHOD OF REMOVING AND PREVENTING ACCUMULATION IN COOLING SYSTEMS
William E. Zimmie, Bay Village, Ohio, and Frederick W. Bloecher, Jr., Stamford, Conn.; said Bloecher assignor to said Zimmie
No Drawing. Filed Oct. 16, 1961, Ser. No. 145,438
14 Claims. (Cl. 134—22)

This invention relates to a method of removing accumulations from cooling systems and more specifically to a method of using water-soluble organic polymers to remove and prevent accumulations in cooling systems. Still more specifically, it relates to the use of only small amounts of these polymers for removing and preventing mud and silt from accumulating in industrial cooling systems.

The majority of water now used in industrial cooling systems, e.g. cooling jackets of open hearth furnaces, etc., generally is obtained from rivers, ponds, bays, lakes, or the like, because the quantity needed to operate these systems is too large to afford the cost of city water. In addition to cost, there are instances where large quantities of city water are not available. While there is a substantial saving in cost by using river water, etc., there is, however, the added problem of corrosion, mud, and silt accumulating in these systems.

It is presently the practice to remove most of the large particles of mud, dirt, sand, or the like from the water by passing it through a screen before it goes to the cooling system. Even with this screening, however, there still exists a substantial build-up of rust, mud, and silt which, as it accumulates, acts as an insulator and decreases the efficiency of the cooling systems. These accumulations not only will decrease the efficiency but if left unchecked will plug the piping of the system, completely, so that eventually it will have to be replaced. In addition, this mud accumulation has a low pH which causes the system to corrode at a much faster rate than ordinary. The rate of corrosion is accelerated because of the acidic nature of the materials that become trapped in the mud as it accumulates in the system. Consequently, there is an urgent need for a commercial method of preventing mud of river water, or the like, from accumulating in these cooling systems. There is likewise a need for a method of removing these mud deposits once they have accumulated. This is particularly true in industrial cooling systems where large volumes of river water are used, such as those found on electric furnaces, compressors, generators, transformers, soaking pits, motors, reheating furnaces, and the like.

To meet this need, it has now been discovered that accumulations of mud, rust, and slit in the jackets or pipings of cooling systems can be prevented or removed by flushing the system with a small amount of water-soluble, polyelectrolytic organic polymer. These polymers are noncorrosive and noninjurious to any metal structure, material, or form of life. They agglomerate finely dispersed mud and silt particles into a light, fluffy, loose floc which remains suspended and thus easily removed from the system by the flow of water. Small quantities of these polymers added to the water flowing into the cooling system will remove most of the accumulations that have become imbedded over a period of time and also will prevent any further accumulation. This treatment can take place with the cooling system in operation. The mud and silt simply is carried from the system by the polymer as it flows with the water through the piping.

One of the big problems in the steel industry, for example, exists in the accumulation of mud in the cooling lines of the slab-reheat furnaces. Here the corrosion and accumulations are, sometimes, of such a magnitude that the piping has to be replaced about every six months. In addition to the cost of replacing the piping, there is also a substantial loss of materials, manhours, and production, due to the closing down of the furnace.

For instance, in the transformers on blast furnaces, increased power and thus increased production from the furnace can be obtained by treating the transformer cooling system with the water-soluble polymers according to this invention. This treatment minimizes the danger of getting clogged pipes, which eventually would cause the transformer to overheat and thus decrease the power output. In other systems, such as in the controlled atmosphere furnaces, it is normally the practice to shut down the furnaces and then purge them of the volatile gases before blowing air through their core plates to remove the accumulations. Any attempt to air-blow these lines while the furnace is still in operation may result in an explosion because of the possibility of air leaking into the volatile gas. By periodically flushing the core plates with these polymers, however, the furnaces can be operated continuously and efficiently without any stoppage.

Accordingly, it is an object of this invention to provide a method of removing accumulations of mud and silt or the like from cooling systems.

It is another object of this invention to provide a method of preventing mud and silt, or the like, from accumulating in water cooling systems.

It is still another object of this invention to provide a method of improving the efficiency of water cooling systems.

It is a still further object of this invention to minimize the operation and maintenance cost of aqueous cooling systems by preventing corrosion and the accumulation of mud and silt, or the like.

It is a still further object of this invention to provide a method of preventing or removing the accumulation of mud and silt in water cooling systems while they are in continuous operation.

These and other objects will become apparent from a further and more detailed description of the invention as follows:

It has been discovered that only small amounts of certain water-soluble polyelectrolytic organic polymers can be used to prevent or remove accumulations in aqueous cooling systems. Still more specifically, it has been discovered that less than two percent by weight of the polymers, based on the weight of river water, can be used to remove or prevent accumulations of mud and silt, or the like, in industrial cooling systems. Preferably, however, these polymers, ranging in amounts up to 1.0 percent by weight of the water, can be used most effectively and efficiently in systems using large volumes of river water.

The polyelectrolytic organic polymers impart to the mud and silt fluffy characteristics which cause them to be readily suspended and thus easily removed. Even silt or mud that has settled and accumulated into a hard-packed bed is converted by the polymer into flocs and re-suspended in the water which is easily pumped from the system. Contrary to what ordinarily would be expected, only small quantities of these polymers, i.e. less than one percent by weight, react with the fine dispersions of mud and silt to form a material that is very light and fluffy and thus readily suspended in the water. Normally, as finely dispersed particles are coagulated into larger ones, they usually settle out of suspension, but here even the mud that has already settled in the cooling system is resuspended in the form of a fluffy material that is removed easily by the flow of water. The function of the polymers here, is contrary to what ordinarily would be expected. Generally, mud and silt that accumulates in cooling systems is composed predominantly of oxides of iron and silica together with aluminum oxide and organic materials. The aluminum oxide and organic materials, together with other impurities appear to have an influence in causing the particles of silica and the oxides of iron to unite to form a hard-caked mud or silt which cannot be removed easily by flushing with water. Apparently the polymers affect the surface chemistry of the various mud components in such a way as to cause the formation of a dispersed flow which prevents classification of the solids and causes them to remain in a fluidized suspension which can be removed.

Among the flocculating agents useful for the fluidizing of silt deposits are the polyelectrolytes represented by polymers of compounds having the formula

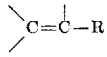

wherein R is selected from the group consisting of nitrile, amide and carboxyl radicals, COOM where M is a lower alkyl radical preferebly of 1 to 4 carbon atoms, and the water soluble salts thereof. Elements such as halogens, particularly chlorine, or alkyl or aryl groups as well as hydrogen may be present as the backbone hydrocarbon chain of the polymer.

Particularly suitable polyelectrolytic polymers for use in this invention are the polymers of arcrylic or methacrylic acid derivatives, for example, acrylic acid, the alkali metal and ammonium salts of acrylic acid, methacrylic acid, the alkali metal and ammonium salts of methacrylic acid, acrylamide, methacrylamide, the N-alkyl substituted amides, the N-aminoalkylamides, and the corresponding N-alkylaminoalkyl substituted amides, the aminoalkyl acrylates, the aminoalkyl methacrylamides, and the N-alkyl substituted aminoalkyl esters of either acrylic or methacrylic acids. These polymeric compositions may be homopolymers or they may be copolymers with other copolymerizing monomers, such as ethylene, propylene, isobutylene, styrene, a-methylstyrene, vinyl acetate, vinyl formate, alkyl ether, acrylonitrile, methacrylonitrile, vinyl chloride, vinylidene chloride, the alkyl acrylates, the alkyl methacrylates, the alkyl maleates, and the alkyl fumarites, and other olefinic monomers copolymerizable therewith. The copolymers of this type, having at least 50 mole percent of the acrylic or methacrylic acid derivatives, are preferred, and especially when the comonomer is hydrophobic or has no ionizable groups. Polymers of this type may be prepared directly by the polymerization of suitable monomers, or by the afterchemical reaction of other polymers, for example by the hydrolysis of acrylonitrile or methacrylonitrile polymers.

In connection with the various types of polyelectrolytic polymers suitable for the practice of this invention, the hydrophilic polymer may be prepared directly by the polymerization or copolymerization of one or more of the various available organic monomers with aliphatic unsaturation, if the said compounds contain a hpdrophilic group, for example, carboxyl groups. Generally, more types of polyelectrolyte polymers can be prepared by subsequent reactions of polymers and copolymers. For example, polymers containing nitrile groups may be hydrolyzed to form water-soluble amide and carboxy containing polymers or hydrogenated to form amine-containing polymers. Similarly, copolymers of maleic anhydride and vinyl acetate may be hydrolyzed to form polymers containing hydrophilic lactone rings. Other hydrophilic polymers can be prepared by the hydrolysis of copolymers of vinyl acetate wherein the acetyl groups are removed leaving hydroxy groups which promote the solubilization effect of polyelectrolytic groups present. By other reactions non-hydrophilic polymers may be converted into lactam or amide containing polymers which are more hydrophilic. Polyvinyl alcohol, not in itself a polyelectrolyte, may be converted into polyelectrolyte by esterification with dibasic acids, one of said carboxylic acid groups reacting with the alcohol radical and the other providing the hydrophilic characteristics by a carboxy group on the side chain. Still other types of polymers may be prepared by reacting halogen containing polymers, for example, the polymers or copolymers of vinyl chloroacetate or vinyl chloroethyl ether, with amines to form amine salt radicals and quaternary ammonium radicals whereby hydrophilic characteristics are introduced into what otherwise would be an insoluble polymer. Other soluble polymers can be prepared by the amonolysis of ketone containing polymers, for example, polyvinyl methyl ketone. Similarly active halogen atoms may be reacted with bisulfite to substitute sulfonic acid groups for the reactive halogens.

Thus, the various polyelectrolytes of the types described above are ethylenic polymers having numerous side chains distributed along a substantially linear continuous carbon atom molecule. The side chains may be hydrocarbon groups, carboxylic acid groups or derivatives thereof, sulfonic acid groups or derivatives thereof, phosphoric acid or derivatives thereof, heterocyclic nitrogen groups aminoalkyl groups, alkoxy radicals and other organic groups, the number of which groups and the relative proportions of hydrophilic and hydrophobic groups being such as to provide a water-soluble polymeric compound having a substantially large number of ionizable radicals. The length of the said continuous carbon chain must be such as to provide compounds having a weight average molecular weight of at least 10,000.

Among the various polymers as described above and water-soluble salts thereof useful in the practice of the present invention, there may be mentioned hydrolyzed polyacrylonitrile and polyacrylamide, sulfonated polystyrene, acrylamide-acrylic acid copolymers, polyacrylic acid, ½ calcium salt of hydrolyzed 1:1 copolymer of vinyl acetate-maleic anhydride, hydrolyzed styrene-maleic anhydride copolymer, ammonium polyacrylate, sodium polyacrylate, ammonium polymethacrylate, sodium polymethacrylate, diethanolammonium polyacrylate, guanidinium polyacrylate, dimethyl-aminoethyl polymethacrylate, acrylamide-acrylonitrile copolymer, methacrylic acid-dimethylaminoethyl methacrylate copolymer, sodium polyacrylate-vinyl alcohol copolymer, hydrolyzed methacrylic acid-acrylonitrile copolymer, vinyl acetatemaleic anhydride copolymer, vinyl formate-maleic anhydride copolymer, vinyl methyl ether-maleic anhydride copolymer, isobutylene-maleic anhydride copolymer, styrenemaleic anhydride copolymer, ethyl acrylate-maleic anhydride copolymer, vinyl chloride-maleic anhydride copolymer, hydrolyzed acrylonitrile vinyl acetate copolymer, hydrolyzed acrylonitrile - methacrylonitrile copolymer, hydrolyzed acrylonitrile-methacrylonitrile-vinyl acetate terpolymer, hydrolyzed acrylonitrile-methacrylic acid copolymer, vinyl pyridine-acrylonitrile copolymer, etc. Polymers containing cationactive groups also are useful. Suitable compounds are, for example, ethyl acrylate and acrylamidopropyl-benzyldimethyl-ammonium chloride, copolymers of methylolacrylamide and acrylamidopropylbenzyldimethylammonium chloride, copolymers of butadiene and 2-vinyl pyridine, and certain quaternary compounds such as polydimethylaminostyrene quaternized with benzyl chloride, allyl chloride, etc. and quaternized copolymers of vinyl alcohol and morpholinylethylvinylether and the like.

The molecular weight of these polymers is fairly ambiguous. Molecular weights as low as 100,000 are useful as are molecular weights which range over 5 to 15 million. As long as the polymers are sufficiently low in molecular weight so as to be water soluble they have the characteristics required. Polymers of molecular weights of well over 2 million have such solubility. The difficulty of measuring molecular weights in the range of 2 to 20 million causes the numerical values to be somewhat ambiguous. Viscosity measurements, particularly intrinsic viscosity determinations, are particularly effective in attempting to determine the molecular weights in this range.

The polyacrylamides are particularly useful in the present invention. Polyacrylamide with a molecular weight of approximately 4 to 6 million gives good results.

Polyelectrolytes have centers of electronic activity along the chain. Polyacrylamides, for instance, usually have a few polyacrylic acid links along the chain and, with molecular weights of a million or two, the percentage of such acid links is very small; still, there are enough acid links or other centers of electronic activity to bridge two or more particles and in effect cause various centers of electronic activity on the same molecule to interact with more than one particle. Without being limited to the above or the following theories as to the operations involved in the present invention, the results which occur are consistent with these theories.

It is important to note that flocculation in a given colloidal system cannot be increased indefinitely beyond a particular optimum polymer concentration. The various physical laws which explain this phenomenon are rather involved, and the most technical aspects of them are beyond the scope of this application. It may be said, however, that up to the optimum concentration all of the polymer added to the colloidal system is absorbed on the surfaces of the silt particles and very little is left in the solution itself. The point beyond which complete absorption fails to take place corresponds generally to the optimum polymer/silt ratio. If the flocs formed in the presence of excess polymer are agitated they degrade faster than those formed in the presence of the optimum polymer to silt ratio. If the flocs are broken apart, fresh surfaces are exposed upon which the polymer is absorbed rapidly. The flocs cannot reform as well as before because the new polymer molecules have insulated the portions of the surface which previously had served as so called "bridgeheads."

The existence of the optimum ratio indicates the presence of two competing processes when copolymer is added to a suspension. These processes are: (1) the formation of polymer bonds to a single particle, and (2) the formation of polymer bridges between particles. Both mechanisms must always occur because (2) is simply a second step, which can occur only after reaction (1). The extent to which (2) occurs depends upon the frequency with which the particles approach closely enough to form the second bond which, in turn, depends upon the pulp density, the surface charge of the particles, the temperature and the polymer concentration. Large numbers of collisions, and hence a dominating bridging will occur when the pulp density is high, when the number of silt particles per unit weight of silt aggregate is high, and when the repulsive surface charges are low. These effects with the polyelectrolytes, particularly polyacrylamides, are effective over the range of pH normally found in river water silt. Up to a point, increasing the polymer usage is beneficial because more bridges are formed. However, excessively high polymer concentration is detrimental because the excess material tends to cover or insulate the exposed surfaces before interparticle collisions needed for bridging can occur.

Higher rather than lower molecular weight polymers are generally but not always more effective because a larger portion of the high molecular weight polymer present in a system in excess of the optimum ratio previously mentioned can be utilized in floc formation, while a smaller portion of the lower weight polymers in excess of the optimum ratio is adsorbable because of the detrimental phenomenon of insulation previously discussed. Therefore, the degree of flocculation is lessened by the addition of excess lower weight polymers.

Polymer adsorbed on mineral surfaces may be held by at least three distinctive types of bonding. Any one, or a combination of the three, may be operative in a given system. The principal mode of attachment of polyacrylamide type flocculants is by hydrogen bonding. This is a common type of bonding exhibited by organic acids, amides, alcohols, amines, and others which contain a hydrogen atom attached to a strongly electronegative atom. In these compounds, the hydrogen atom has lost much of its electronic atmosphere, and is ready to accept electrons donated by the surface atoms of the silt particles. The hydrogen is then shared between the surface atoms (usually oxygen) and the oxygen or nitrogen in the polymer.

Specific electrostactic site-bonding is another type of bonding which occurs when the polymer forms a salt-like attachment to specific groups or sites on the particle. Examples of this type of bonding are found in the adsorption of polyacrylic acid on clay, limestone, and the like, in which the surface calcium atoms essentially precipitate a calcium acrylate on the particles. In general, bonding of this type is limited to solids having metal ions in their lattices. In practice, the number of functional groups forming such bonds is limited to carboxylates, phosphates, sulfonates, and mercaptan derivatives.

The last of the three types of bonding is known as non-specific, double-layer interaction. This is an electrostatic interaction which occurs between a charged mineral surface and the ions in solution. The charge on the ion rather than its chemical nature primarly determines its attraction to the surface. Since most solids are negatively charged when suspended in water, positively charged polymers will be attracted to the surface, and will enter the ionic double layer. For this reason variations in the degree of flocculation in a given system may be obtained by making the polymer either cationic or anionic.

The effectiveness, then, of a given polymer in a given colloidal system is dependent on a number of factors. Among these factors may be included the pH of the system, the type and molecular weight of polymer added to the system, the presence or absence of electrolytes, the chemical and physical state of surfaces of the silt particles, and the charge of the polymer. It should be remembered, however, that in any event the degree of flocculation which may be obtained is primarily a function of the polymer chain length and weight.

In removing silt that has accumulated or deposited in cooling systems, less than 2 percent by weight of the polymer, based on the weight of the water, can be used and preferably less than 1 percent by weight can be used effectively. Water passing to the cooling system containing approximately 0.001 to 1.0 percent by weight of the polymer is permitted to be in contact with the accumulations of mud and silt for periods ranging from a few minutes up to 72 hours, or more. The water is agitated so as to give the electrolytic polymer maximum contact with the mud and can be maintained at a temperature ranging from about 35° F. to 130° F. It may be desirable in some instances to apply heat where higher concentrations of the polymer are used. However, the temperature of the water containing the polymer is not critical and ambient temperatures are satisfactory.

If desired, stock solutions can be prepared by adding 1 to 20 percent by weight of the polymer to water at a temperature of about 90° F. This concentrated solution then can be metered into the water flowing into the system to obtain the required concentration. Alternatively, a dry form of the polymer can be added to the system. This can be done by simply adding the dry particles to the water as it is taken in at the main inlet from its source. The water coming from the main source then can be piped into one or more different cooling systems.

After the solution of polymer has been in contact with the mud and silt for a reasonable period, e.g. 1 to 8 hours, depending on the magnitude of accumulation, the system is flushed with water. In some instances, the cleaning action can be accelerated by bubbling air through the passages with the polymer. This serves as a form of agitation which gives a cleaner system and requires a shorter period of treatment.

In preventing accumulations of mud and silt, or in maintaining a clean system, less than 0.05 percent by weight of the polymer can be added to the water flowing through the system. For example, in cooling systems where as much as 10,000 gallons of water per minute are used, the system can be treated by adding the polymer to the water over a period of about 1 to 30 minutes to give an average concentration of about 0.01 percent or less. Once a clean system is obtained, it can be maintained in this condition by passing water comprising 0.01 to 100 parts per million of the polymer through the system periodically. This treatment can be repeated as often as required. It may be necessary to treat a system once or twice a day, once a week, or once a month, etc. The frequency of the treatment will depend on the condition of the water and the efficiency required of that particular cooling system.

A particularly important aspect of this invention is that once a clean system is attained, it can be kept in this condition without discontinuing its operation. With periodic treatments, the efficiency is increased along with the life of the system. The reason for this is because by removing the mud, the material which is responsible for most of the corrosion also is removed. Most muds and silts found in river waters, etc. have a low pH or are acidic and thus set up a galvanic cell which causes corrosion. Consequently, by periodically removing the mud the overall operating cost is materially reduced.

A specific illustration of how the polyelectrolytic polymers are used to prevent or remove accumulations is shown by the following examples.

The roll bearings on a controlled atmosphere furnace are supplied with cooling water by ¼ inch copper tubes. Connected to the bearing in series. Heretofore, city water was used in these cooling systems, but because of cost it has now been replaced with river water. To prevent excessive rust, mud, and silt accumulation in these tubes a pump is connected to the cooling-water inlet and water containing approximately 0.01 percent by weight of a polyelectrolyte is passed therethrough until the effluent comes out clear. This treatment can be repeated periodically, depending on the magnitude of the accumulations, or it can be continuous with less than 10 parts per million of the polymer if it is desirable to keep the system completely free of mud deposits at all times.

A reheat furnace table is a water-cooled table of pipes which is used to support slabs of hot steel between rollers. When a slab of steel cools, it must be placed in a furnace to be reheated to its rolling temperature. The cooling table supports these hot slabs but in the past has burned out about every 3 to 6 months because of the accumulation of mud and silt. The efficiency and life of these tables is increased, however, by periodically passing through the system water which contains approximately 0.001 to 0.01 percent by weight of a polyacrylamide having a molecular weight of approximately four million. Alternatively, a cooling table which has a large accumulation of mud, or is completely plugged, is flushed free by treating the passages with water containing approximately 0.01 to 1.0 percent by weight of polyacrylamide. Here, the temperature of the water is preferably between 60° F. and 90° F., and the passages are allowed to be in contact with the polymer for a period ranging from one-half to 8 hours depending on the accumulations. The mud and silt are converted by the polymer to a light, fluffy material which is easily flushed from the system by the cooling water. Once the passages are cleaned and free from accumulations, they are mtaintained in this condition by periodically passing lower concentrations of the polymer, i.e. less than 1.0 part per million, through the system. However, in aggravated situations where excess mud and the like has accumulated, it is possible to use as much as 1 to 10 percent by weight of the polymer, or more.

Since the amount of mud and silt in river water varies depending on its source, the amount of polyelectrolytic polymer to be used in each case will vary also. In most cases, however, it was found that satisfactory results can be obtained by using anywhere from 0.01 to 10,000 parts of polymer per million parts by weight of water, depending on the source of water and the magnitude of the accumulations of mud therein.

It is, therefore, highly desirable to have a commercially feasible method of preventing corrosion and removing accumulations of the type described. It was unexpected that small amounts of these water-soluble polyelectrolytes would be adsorbed by mud and silt to give a light material which would remain suspended in water. The use of these polyelectrolyte polymers not only decreases operating costs by using river water but also increases the life of the cooling system. In adition, the efficiency of the system is increased to a point where the overall operating cost is reduced materially.

While this invention has been described with reference to specific examples, it is to be understood that the invention is not intended to be limited to such examples, except as recited hereinafter in the appended claims.

This application is a continuation-in-part of application Serial No. 8,215, William E. Zimmie et al., filed on February 12, 1960.

What is claimed is:

1. A method of removing and preventing the accumulation of mud and silt in water-cooled industrial heat-exchanges and cooling systems, which comprises treating the mud and silt by adding to the water flowing through the systems about 0.05 to 200 parts by weight of a water-soluble polyelectrolytic organic polymer per million parts by weight of the water; said water passing through the system with sufficient velocity to carry the treated accumulations; said polymer having an average molecular weight ranging from about 100,000 to 15,000,000 and is prepared from compounds characterized by the formula

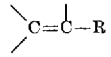

wherein R is selected from the group consisting of nitrile, amide, and carboxyl radicals.

2. The method of claim 1 further characterized in that said polymer is a co-polymer.

3. The method of claim 1 further characterized in that R is an amide radical.

4. The method of claim 1 further characterized in that R is a carboxyl radical.

5. The method of claim 4 further characterized in that the carboxyl radical is represented by —COOM wherein M is selected from the group consisting of hydrogen, ammonium, metals, and organic radicals.

6. A method of removing and preventing the accumulation of mud and silt in water-cooled industrial heat-exchangers and cooling systems, which comprises treating the mud and silt by adding to the water flowing through the systems about 0.1 to 100 parts by weight of a water-soluble polyacrylamide per million parts by weight of the water; said water pasing through the systems with sufficient velocity to carry the treated accumulations; said polyacrylamide having an average molecular weight ranging from about 100,000 to 15,000,000.

7. A method of removing and preventing the accumulation of mud and silt in water-cooled industrial heat-exchangers and cooling systems, which comprises treating the mud and silt by periodically adding to the water flowing through the systems about 0.05 to 100 parts by weight of a water-soluble polyelectrolytic organic polymer per million parts by weight of the water; said water passing through the systems with sufficient velocity to carry the treated accumulations; said polymer having an average molecular weight ranging from about 100,000 to 15,000,-

000 and is prepared from compounds characterized by the formula

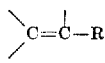

wherein R is selected from the group consisting of nitrile, amide, and carboxyl radicals.

8. The method of claim 7 further characterized in that the accumulations of mud and silt result from the water flowing through the systems coming from rivers, lakes, ponds, and bays.

9. The method of claim 7 further characterized in that the water flowing through the systems has a temperature ranging from about 35° F. to 130° F.

10. A method of removing and preventing the accumulation of mud and silt in water-cooled industrial heat-exchangers and cooling systems, which comprises treating the mud and silt by adding to the water flowing through the systems about 1.0 to 100 parts by weight of a water-soluble polyacrylamide per million parts by weight of the water; said water passing through the systems with sufficient velocity to carry the treated acumulations; and said polymer having an average molecular weight ranging from about 4,000,000 to 6,000,000.

11. A method of removing and preventing the accumulation of mud, silt, and related materials coming from the cooling water in industrial heat-exchangers and cooling systems, which comprises treating the accumulations by adding to the water flowing through the systems about 0.05 to 200 parts by weight of a water-soluble polyelectrolytic organic polymer per million parts by weight of the water; said water passing through the systems with sufficient velocity to carry the treated accumulations; said polymer having an average molecular weight ranging from about 100,000 to 15,000,000 and is prepared from compounds characterized by the formula

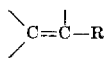

wherein R is selected from the group consisting of nitrile, amide, and carboxyl radicals.

12. A method of removing and preventing the accumulation of mud and silt in industrial heat-exchangers and cooling systems using river water as the coolant, which comprises treating the mud and silt by adding to the water flowing through the systems about 1.0 to 100 parts by weight of a water-soluble polyelectrolytic organic polymer per million parts by weight of the water; said water passing through the systems with sufficient velocity to carry the treated accumulations; said polymer having an average molecular weight ranging from about 100,000 to 15,000,000 and is prepared from compounds characterized by the formula

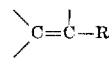

wherein R is selected from the group consisting of nitrile, amide, and carboxyl radicals.

13. The method of claim 12 further characterized in that said polymer is polyacrylamide having an average molecular weight ranging from about 4,000,000 to 6,000,000.

14. A method of removing and preventing the accumulation of mud, silt, and related materials in industrial heat-exchangers and cooling systems utilizing river water as the coolant, which comprises treating the mud and silt by adding to the water flowing through the systems about 0.05 to 200 parts by weight of a water-soluble polyacrylamide per million parts by weight of the water; said water passing through the systems with sufficient velocity to carry the treated accumulations and said polymer having an average molecular weight ranging from about 100,000 to 15,000,000.

References Cited in the file of this patent
UNITED STATES PATENTS

| | | |
|---|---|---|
| 1,892,093 | Battistella | Dec. 27, 1932 |
| 1,961,232 | Maust et al. | June 5, 1934 |
| 2,470,830 | Monson | May 24, 1949 |
| 2,625,529 | Hedrick et al. | Jan. 13, 1953 |
| 3,025,239 | Barrett et al. | Mar. 13, 1962 |

OTHER REFERENCES

Ruehrwein et al.: Mechanism of Clay Aggregation by Polyelectrolytes, Soil Science, 73 (6), June 1952, pp. 485–492.

Disclaimer and Dedication

3,085,916.—*William E. Zimmie*, Bay Village, Ohio, and *Frederick W. Bloecher, Jr.*, Stamford, Conn. METHOD OF REMOVING AND PREVENTING ACCUMULATION IN COOLING SYSTEMS. Patent dated Apr. 16, 1963. Disclaimer and dedication filed Dec. 7, 1970, by the assignee, *W. E. Zimmie, Inc.*

Hereby disclaims and dedicates to the Public the terminal portion of the patent subsequent to Mar. 5, 1980.

[*Official Gazette May 11, 1971.*]